Patented Aug. 8, 1944

2,355,533

UNITED STATES PATENT OFFICE 2,355,533

CELLULOSE ESTER COMPOSITIONS

William H. Holst, Tamaqua, Pa., assignor to Atlas Powder Company, Wilmington, Del., a corporation of Delaware No Drawing. Original application March 12, 1940, Serial No. 323,583. Divided and this application August 22, 1942, Serial No. 455,727

8 Claims. (Cl. 106—176)

The present invention relates to cellulose ester compositions and more particularly to compositions comprising lower fatty acid esters of cellulose and hexitol tributylidenes.

An object of the invention is to provide a class of modified cellulose ester compositions which possess properties of improved plasticity and alkali resistance.

A particular object is to provide a composition of cellulose mixed esters and hexitol tributylidenes.

The above and other objects wil become apparent from the following description and claims.

This application is a division of my copending application Serial Number 323,583, filed March 12, 1940.

Cellulose esters of lower fatty acids, such as cellulose acetate, cellulose acetate propionate, and cellulose acetate butyrate, are widely used as bases for plastics, film-forming compositions, filaments and the like. It is known that in their unmodified state these esters are unsuitable for most practical applications, being deficient in flexibility, elasticity, and resistance to mechanical and chemical actions.

It has been found in accordance with the present invention that the condensation products of hexitols, such as mannitol, sorbitol, dulcitol or other isomeric hexitols with an aldehyde or ketone of 4 carbon atoms, are valuable modifying agents for the lower fatty acid cellulose esters. Examples of these condensation products are mannitol tri-n-butylidene (from mannitol and n-butyraldehyde), sorbitol tri-2-butylidene (from sorbitol and methyl ethyl ketone), and mannitol tri-isobutylidene (from manintol and isobutyraldehyde).

The hexitol butylidenes are particularly useful as modifiers for plastics. In the first place many of the ordinary resins and plastics are plasticized by these compounds so that they can be used to impart flexibility, resistance to cracking and the other properties sought in plastic compositions. There is, however, a further advantage for the use of these butylidenes in connection with resins and plastics. The hexitol butylidenes are very resistant to the action of alkalies and when mixed with a resin or plastic the mixture is found to have high alkali resistance. This property is of considerable practical advantage as in the case of a coating composition which is to be used in contact with an alkaline solution. Such coating compositions are used, for example, in lining containers of various sorts. Another use is in the field of molding compositions where the molded part will be subjected to the action of alkali. Many other examples could be given of situations in which alkali resistant plastic or resinous compositions are useful. Among the plastics which may be used are cellulose esters and ethers and various natural and synthetic resins among which may be mentioned specifically the resins of the phenolaldehyde, ester gum, alkyd, coumarone, polyvinyl, polyamide, methacrylate, polystyrene, and other equally well-known types. The butylidenes can be used advantageously with many types of plastics as the sole modifying or plasticizing agent but in some cases it will be found preferable to use the butylidenes in conjunction with one or more of the usual plasticizers or modifiers known to the art.

The modifiers according to the invention can be prepared in a number of ways as will be apparent to those skilled in this art. The following specific examples, however, show methods by which the products can be made. Numerous variations of these methods are possible and it is not intended to limit the invention to the particular manner of preparation of the products. While the examples are directed to mannitol and sorbitol, it will be understood that the other hexitols can be used.

EXAMPLE 1

Tri-n-butylidene mannitol 91 g. (0.5 mol) of mannitol and 120 g. (1.66 mol) of n-butyraldehyde were mixed with 500 ml. of dioxane. To the above solution 25 ml. of concentrated sulfuric acid were slowly added and the entire mass refluxed very gently for one hour. Upon cooling, two layers separated out. This mixture was poured into 1500 ml. of water containing 40 g. of NaOH (a slight excess over that necessary to neutralize the $H_2SO_4$). The entire solution was extracted with 100 ml. of ether and the ether solution dried with "Drierite". The drier was removed by filtration and the volatile solvents distilled from the filtrate under reduced pressure. The residue was distiled under vacuum and gave 135 g. of a liquid boiling at 160–161° C. at 3 mm. pressure. The yield was 79% of theory.

Analysis showed the product to consist of tributylidene mannitol. The product was compatible with cellulose acetate to the extent of 15%, with cellulose acetobutyrate more than 70%, and with ethyl cellulose more than 50%. These percentages are based on the weight of cellulose derivative.

EXAMPLE 2

Tri-n-butylidene sorbitol 91 g. (0.5 mol) of crystalline sorbitol and 120 g. (1.66 mol) of n-butyraldehyde were mixed with 500 ml. of dioxane and to this were added 25 ml. of concentrated $H_2SO_4$. This mixture was heated on a steam bath for one hour with stirring. At the end of this time the entire mass was poured into 1500 ml. of water containing 40 g. of NaOH for neutralization. The aqueous solution was extracted with 100 ml. of ether and the ether solution separated and dried with "Drierite." After filtering off the drier the volatile solvents were distilled from the filtrate under reduced pressure and the residue was distilled under vacuum. The residue contained two fractions, 68 g. of a liquid boiling at 162–167° C. at 4 mm. pressure and 37 g. of a liquid boiling at 172–177° C. at 4 mm. pressure. Analysis of both fractions showed them to consist of isomeric forms of tributylidene sorbitol. The sorbitol tributylidene has substantially the same physical properties as mannitol tributylidene. The lower boiling fraction obtained in the condensation was found to be 20% compatible with cellulose acetate. This product was insoluble in water at 25° C. and at 90° C. was soluble only to the extent of 0.03 g. per 100 g. water.

EXAMPLE 3

Tri-2-butylidene mannitol 91 g. (0.5 mol) of mannitol were mixed with 900 ml. (720 g. or 10 mols) of methyl ethyl ketone and to this 25 ml. of concentrated $H_2SO_4$ were added drop-wise. In this process the ketone was used both as reactant and as reaction medium, hence the large excess over the reacting proportion. The resulting mixture was then heated at 60–65° C. for three hours with stirring. At the end of this time all of the mannitol had dissolved. This solution was then mixed with 1500 ml. of water containing 40 g. of NaOH. The excess methyl ethyl ketone separated out and was removed. The water layer was extracted once with 500 ml. of ether and after separation the ether layer was mixed with the methyl ethyl ketone layer previously recovered. This ethereal solution was dried with "Drierite." The drier was then removed from the solution by filtering and the volatile solvents removed from the filtrate by distillation under reduced pressure. The residue was distilled in vacuo. The product consisted of 70 g. (46% theory) of a liquid of boiling point 143–148° C. at 4 mm. pressure. Analysis showed the product to consist of tri-2-butylidene mannitol.

Tri-2-butylidene mannitol is insoluble in water at 25° C. and soluble to the extent of 0.02 g. per 100 g. of water at 90° C. It is compatible with cellulose acetate to the extent of 20%.

EXAMPLE 4

Tri-2-butylidene sorbitol 91 g. (0.5 mol) of crystalline sorbitol were mixed with 120 g. (150 ml.) of methyl ethyl ketone (1.66 mols) and 500 ml. of dioxane. To this were carefully added 25 ml. of concentrated $H_2SO_4$. The above mixture was heated two hours with stirring on a water bath at 60° C. At the end of this time 15 g. of sorbitol were recovered. The solution was poured into 1500 ml. of water containing 40 g. NaOH for neutralizing the sulfuric acid. The entire aqueous mixture was extracted with 1000 ml. of ether and the ethereal solution was dried with "Drierite." After filtering off the drier the volatile solvents were removed from the filtrate by distilling under reduced pressure. The residue was distilled under vacuum and gave 57 g. (38% theory) of a liquid boiling at 148–153° C. at 4 mm. pressure. Analysis of the product showed it to consist of tri-2-butylidene sorbitol.

The product was insoluble in water at 25° C. and soluble to the extent of 0.88 g. per 100 g. water at 90° C. The product was also compatible with cellulose acetate to the extent of 20%.

EXAMPLE 5

Tri-isobutylidene mannitol 91 g. (0.5 mol) of mannitol and 120 g. (1.66 mol) of isobutyraldehyde were mixed with 500 ml. of dioxane. To the above solution 25 ml. of concentrated sulfuric acid were slowly added and the entire mass heated at 95° C. for one-half hour. Upon cooling, two layers separated out. This mixture was poured into 1500 ml. of water containing 40 g. of NaOH (a slight excess over that necessary to neutralize the $H_2SO_4$). The entire aqueous solution was extracted with 1000 ml. of ether and after separating, the ether solution was dried with "Drierite." The drier was removed by filtration and the volatile solvents distilled from the filtrate under reduced pressure. The residue was distilled under vacuum and gave 164 g. of a liquid boiling at 159–161° C. at 3 mm. pressure. The yield was 92% of theory. This liquid crystallized upon standing and recrystallization from 90% alcohol gave a crystalline compound, M. P. 46° C.

Tri-isobutylidene mannitol is insoluble in water at 25° C. and soluble to the extent of 0.05 g./100 g. water at 95° C.

This compound is compatible (without causing blushing) to the extent of 30% with cellulose nitrate, 20% with cellulose acetate, more than 70% with cellulose acetobutyrate, and more than 50% with ethyl cellulose.

EXAMPLE 6

Tri-isobutylidene sorbitol 91 g. (0.5 mol) of crystalline sorbitol and 120 g. (1.66 mol) of isobutyraldehyde were mixed with 500 ml. of dioxane and to this were added 25 ml. of concentrated $H_2SO_4$. This mixture was heated at 75° C. for one-half hour with stirring. At the end of this time the entire mass was poured into 1500 ml. of water containing 40 g. of NaOH for neutralization. The aqueous solution was extracted with 1000 ml. of ether and the ether solution separated and dried with "Drierite." After filtering off the drier the volatile solvents were distilled from the filtrate under reduced pressure and the residue was distilled under vacuum. This gave 145 g. of a liquid boiling at 156–8° C./4 mm. The yield was 82% of theory.

Tri-isobutylidene sorbitol is insolube in water at 25° C. and soluble to the extent of 0.08 g./100 g. water at 95° C.

This compound is compatible (without causing blushing) to the extent of more than 50% with cellulose nitrate, 20% with cellulose acetate, more than 70% with cellulose acetobutyrate, and more than 50% with ethyl cellulose.

Example 7

A series of four lacquers was made up from cellulose derivatives and tri-isobutylidene mannitol added as a plasticizer. The cellulose derivatives used were cellulose nitrate, cellulose acetate, cellulose acetobutyrate, and ethyl cellulose. Each lacquer comprised ten parts of the cellulose derivative dissolved in 100 parts of a solvent mixture composed of 75 parts acetone and 25 parts ethyl lactate. To these solutions 20% tri-isobutylidene mannitol was added, based on the amount of cellulose derivative.

Coating films produced from each of these four lacquers possessed good flexibility. Tested for adhesion the lacquers were spread upon brass plates and in each case the film showed good adhesion.

For comparison similar lacquers were made up containing the same cellulose derivatives but lacking any plasticizer. In each case the adhesion and flexibility of these plain films were notably inferior to those produced from similar lacquers containing tri-isobutylidene mannitol.

For further comparison another series of lacquers was made up containing the same cellulose derivatives and using a standard plasticizer, namely dibutyl phthalate. The plasticizer was here employed in the same proportion as the tri-isobutylidene mannitol, that is in the amount of 20% based on the cellulose derivative. From flexibility and adhesion tests on these lacquers it became apparent that tri-isobutylidene mannitol was as good as or better than dibutyl phthalate as a plasticizer. In addition to its plasticizing effect the tri-isobutylidene mannitol imparted a high degree of alkali resistance to the lacquer containing it.

Example 8

In a manner similar to the tests of Example 7 the effectiveness of tri-isobutylidene sorbitol was tested for use in lacquers and the properties of the resulting lacquers compared with lacquers containing no plasticizer and lacquers containing dibutyl phthalate as a plasticizer.

As a result of the tests it appeared that in every case a lacquer containing tri-isobutylidene sorbitol was superior to a lacquer containing no plasticizer. It further appeared that tri-isobutylidene sorbitol was as good a plasticizer for the cellulose derivatives tested as dibutyl phthalate, taking into consideration appearance, flexibility and adhesion of the resulting film. Tri-isobutylidene mannitol appeared to be slightly better as a plasticizer for ethyl cellulose, cellulose acetate, and cellulose acetobutyrate.

The lacquers containing tri-isobutylidene sorbitol had very good alkali resistance.

Example 9

As an example of a molding compound may be cited the following: Bakelite molding power of the grade known as BM-120 has incorporated therewith 10% of tri-isobutylidene mannitol. Resin BM-120 is a product of the Bakelite Corporation and is a mixture of a fusible phenol-aldehyde novolak resin (cf. Carleton Ellis "The Chemistry of Synthetic Resins," 1935 edition, pp. 316-322) and wood flour, the resin being hardened by means of hexamethylene-tetramine. Articles molded from this powder are found to have greatly improved resistance to alkalies. For comparison small discs molded of this mixed composition can be tested alongside of similar discs molded from the straight molding powder. The tests consist of subjecting the discs to the action of alkali solutions, for example, sodium hydroxide of different strengths, over periods of several days. The discs are then weighed to determine increase in weight, increase in weight indicating lack of resistance; the alkali solutions are examined for increase in color, which is an indication of the extent to which the alkali has attacked the disc; and the physical condition of the disc is noted. In each case the molding composition containing tri-isobutylidene mannitol is outstandingly resistant to alkali whereas the unmixed composition is rapidly attacked and at the higher alkali concentration is even disintegrated.

Similar results as to improved alkali resistance are obtainable with the other butylidenes of the present invention. Other resins or plastic materials are also improved as to their alkali resistance by the addition of one of the butylidenes described herein.

"Drierite" referred to above in the examples is a trade name for anhydrous calcium sulfate and the material is used as a dehydrating agent.

The acetals and ketals of the invention are virtually insoluble in water, even at advanced temperatures, so that plastic or resin compositions containing them are not subject to loss as a result of leaching when they are brought into contact with water. Likewise, the modifiers of the invention have very low volatilities and so the plastic or resin composition in which they are present as modifiers retains its modified properties for long periods of time.

The invention is not to be taken as limited by the above specific examples nor by the mode of preparation of the compounds. The invention which it is desired to protect is limited only by the scope of the following claims.

I claim:

1. A composition comprising a lower fatty acid cellulose ester and a hexitol tributylidene.

2. A composition comprising a lower fatty acid cellulose ester and a hexitol tri-2-butylidene.

3. A composition comprising a cellulose mixed ester of acetic acid and an acid of the group consisting of propionic and butyric acids, and a hexitol tri-butylidene.

4. A composition comprising a cellulose mixed ester of acetic acid and an acid of the group consisting of propionic and butyric acids, and a hexitol tri-2-butylidene.

5. A composition comprising a cellulose mixed ester of acetic acid and an acid of the group consisting of propionic and butyric acids, and a sorbitol tri-2-butylidene.

6. A composition comprising a lower fatty acid cellulose ester and a hexitol tri-n-butylidene.

7. A composition comprising a lower fatty acid cellulose ester and a hexitol tri-isobutylidene.

8. A composition comprising a lower fatty acid cellulose ester and mannitol tri-isobutylidene.

WILLIAM H. HOLST.